(12) United States Patent
Huang

(10) Patent No.: US 9,028,128 B2
(45) Date of Patent: May 12, 2015

(54) SIDE-EDGE BACKLIGHT MODULE

(75) Inventor: Jianfa Huang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 270 days.

(21) Appl. No.: 13/642,474

(22) PCT Filed: Jun. 19, 2012

(86) PCT No.: PCT/CN2012/077119
§ 371 (c)(1),
(2), (4) Date: Oct. 19, 2012

(87) PCT Pub. No.: WO2013/181865
PCT Pub. Date: Dec. 12, 2013

(65) Prior Publication Data
US 2013/0329456 A1 Dec. 12, 2013

(30) Foreign Application Priority Data

Jun. 7, 2012 (CN) .......................... 2012 1 0185962

(51) Int. Cl.
*F21V 8/00* (2006.01)
(52) U.S. Cl.
CPC ............ *G02B 6/0023* (2013.01); *G02B 6/0018* (2013.01); *G02B 6/0031* (2013.01)

(58) Field of Classification Search
CPC ... G02B 6/0018; G02B 6/0023; G02B 6/0031
USPC .......................... 362/608, 610, 613, 617, 623
See application file for complete search history.

(56) References Cited

U.S. PATENT DOCUMENTS 7,719,021 B2 * 5/2010 Harrah et al. ................... 257/98

FOREIGN PATENT DOCUMENTS

CN          101614370 A  * 12/2009

* cited by examiner

*Primary Examiner* — David V Bruce
(74) *Attorney, Agent, or Firm* — Cheng-Ju Chiang

(57) ABSTRACT

The present invention provides a side-edge backlight module, which includes a backplane, a light guide plate arranged inside the backplane, a backlight source arranged inside the backplane, and a photo coupler arranged between the light guide plate and the backlight source, whereby light emitting from the backlight source is subjected to light mixing by the photo coupler and then enters the light guide plate so as to improve homogeneity of light illumination of the light guide plate at a location close to a backlight source. The side-edge backlight module arranges a photo coupler between a light incidence surface of a light guide plate and LED lights of a backlight source in order to make lights emitting from the backlight source incident to the light guide plate in a uniform manner thereby providing the light guide plate with homogeneous light illumination.

9 Claims, 2 Drawing Sheets

SIDE-EDGE BACKLIGHT MODULE

BACKGROUND OF THE INVENTION

1. Field of the Invention

The present invention relates to the field of liquid crystal displaying, and in particular to a side-edge backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal display panel itself does not emit light, light must be provided by the backlight module in order to normally display images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal display panel to form a planar light source that directly provides lighting to the liquid crystal display panel. The side-edge backlight module arranges a backlight source of LED light bar at an edge of a back panel to be located rearward of one side of the liquid crystal display panel. The LED light bar emits light that enters a light guide plate through a light incident face of the light guide plate and is projected out through a light exit face of the light guide plate after being reflected and diffused to thereby transmit through an optic film assembly and form a planar light source the liquid crystal display panel.

The current market trend of the backlight module is bezel slimming. The attempt to use less LED lights while making a slim bezel would lead to an increasingly shortened distance between the LED lights and a light incidence surface of a light guide plate. And consequently, insufficient mixture of the lights emitting from the LED lights in the space results, making difference in illumination or color between two adjacent LED lights and generating the so-called "hot spot mura" (which means inhomogeneous brightness). For example, the slimmest bezel that is currently available in 4.9 mm and to effect homogeneous mixture of light between LED lights within such a slim range of the bezel would be a tough challenge.

SUMMARY OF THE INVENTION

An object of the present invention is to provide a side-edge backlight module, which provides replenishment of additional illumination to dark zones between LED lights of a backlight source so as to make a non-continuous light emission surface generated by the backlight source extended to form a continuous light emission surface to thereby effectively overcome the inhomogeneous illumination problem and help making the bezel slimming.

To achieve the object, the present invention provides a side-edge backlight module, comprising a backplane, a light guide plate arranged inside the backplane, a backlight source arranged inside the backplane, and a photo coupler arranged between the light guide plate and the backlight source, whereby light emitting from the backlight source is subjected to light mixing by the photo coupler and then enters the light guide plate so as to improve homogeneity of light illumination of the light guide plate at a location close to a backlight source.

The backlight source comprises a printed circuit board and a plurality of LED lights that is mounted to the printed circuit board and electrically connected to the printed circuit board. Gaps are present between the LED lights.

The photo coupler comprises a main body and a plurality of first slots and a plurality of second slots that face the backlight source. The first slots are arranged to correspond to the LED lights and the second slots are arranged to correspond to the gaps between the LED lights.

The first slots are of a shape of inverted trapezoid, which diverges in an inward direction from an edge of the main body of the photo coupler that faces the LED lights, and the second slots are of a shape of triangle, which converges in an inward direction from the edge of the main body of the photo coupler that faces the LED lights.

The first slots are inverted isosceles trapezoids having a trapezoid bottom corner angle of 35-55° and a trapezoid height of 2-5 mm and the second slots are isosceles triangles having a triangle bottom corner angle that is less than or equal to the trapezoid bottom corner angle of the first slots and a triangle height that is greater than or equal to the trapezoid height of the first slots.

The photo coupler is made of glass, PMMA (Polymethylmethacrylate), PC (Polycarbonate), or MS (Methyl Methacrylate-Styrene Copolymer).

The photo coupler is spaced from the LED lights by a distance of 0.2 mm-1 mm.

The photo coupler is spaced from the light guide plate.

The photo coupler is set in contact with the light guide plate.

The photo coupler is integrally formed with the light guide plate.

The efficacy of the present invention is that the present invention provides a side-edge backlight module, which comprises a photo coupler arranged between a light incidence surface of a light guide plate and LED lights of a backlight source in order to make lights emitting from the backlight source incident to the light guide plate in a uniform manner thereby providing the light guide plate with homogeneous light illumination and thus effectively eliminating the problem of inhomogeneous illumination of the conventional light guide plate at a location close to the backlight source, facilitating bezel slimming, and enhancing quality of the backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
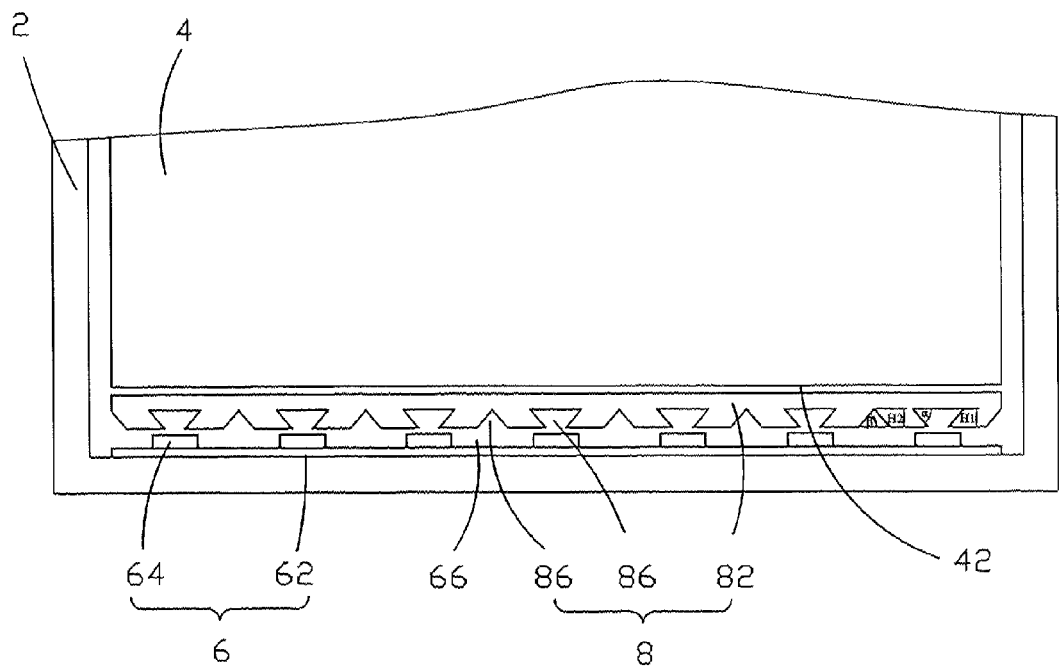
FIG. 1 is a perspective view showing an embodiment of side-edge backlight module according to the present invention.

Referring to FIG. 1, the present invention provides a side-edge backlight module, which comprises: a backplane 2, a light guide plate 4 arranged inside the backplane 2, a backlight source 6 arranged inside the backplane 2, and a photo coupler 8 arranged between the light guide plate 4 and the backlight source 6. In the instant embodiment, the photo coupler 8 is arranged to be spaced from the light guide plate 4. The light guide plate 4 has a light incidence surface 42 and the photo coupler 8 is arranged to oppose the light incidence surface 42 of the light guide plate 4.

The backlight source 6 comprises a printed circuit board (PCB) 62 and a plurality of LED lights 64 that is mounted to the PCB 62 and electrically connected to the PCB 62. Gaps 66 are present between the LED lights 64. In the instant embodiment, the LED lights 64 are of relatively high power and thus, the gaps 66 are made relatively large so that the number of the LED lights 64 is reduced and the cost is lowered down.

The photo coupler 8 is made of a material that shows excellent optic property and chemical stability, such as glass, PMMA (Polymethylmethacrylate), PC (Polycarbonate), or MS (Methyl Methacrylate-Styrene Copolymer), and comprises a main body 82 and a plurality of first slots 84 and a plurality of second slots 86 that face the backlight source 6. The first slots 84 are arranged to correspond to the LED lights 64, while the second slots 86 are arranged to correspond to the gaps 66 between the LED lights 64. The photo coupler 8 is spaced from the LED lights 64 by a distance of 0.2 mm-1 mm.

The first slots 84 are of a shape of inverted trapezoid, preferably isosceles trapezoid, which diverges in an inward direction from the edge of the main body 82 of the photo coupler 8 that faces the LED lights 64. The bottom corner angle $\alpha$ of the trapezoid of the first slots 84 is around 35-55° and the height H1 of the trapezoid is around 2-5 mm.

The second slots 86 are of a shape of triangle, preferably isosceles triangle, which converges in an inward direction from the edge of the main body 82 of the photo coupler 8 that faces the LED lights 64. The bottom corner angle $\beta$ of the triangle of the second slots 86 is less than or equal to the trapezoid bottom corner angle $\alpha$ of the first slots 84 and the height H2 of the triangle of the second slots 86 is greater than or equal to the trapezoid height H1 of the first slots 84.

Figure 2:
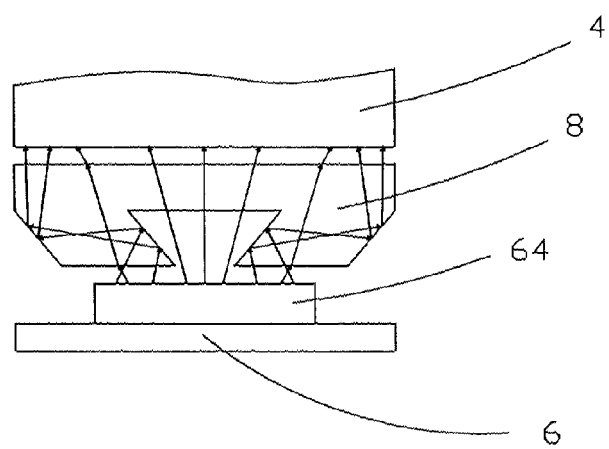
FIG. 2 is a schematic view showing propagation of light that emits from an LED light within a photo coupler of FIG. 1.

As shown in FIG. 2, light emitting from the LED lights 64 enters the light guide plate 4 in three ways. (1) The light emitting from a central portion of each LED light 64 transmits through the photo coupler 8 via the bottom of the first slot 84 of the photo coupler which the LED light exactly opposes. (2) The light emitting from two side portions of the LED light 64 directly travels into the light guide plate 4 without subject to total reflection after entering the photo coupler 8. (3) The light emitting from two side portions of the LED light 64 is subject to total reflection twice by side walls of the photo coupler 8 and then travels into the light guide plate 4. The lights travel in the first and second ways ensure that there is more energy entering the light guide plate 4 at the sites exactly located above the light emission faces of the LED lights 64, while the light travels in the third way is subjected to total reflection by the photo coupler 8 to have the light redirected to non-light-emitting zones corresponding to the gaps between the LED lights 64 and is then further subjected to total reflection to project out, whereby the non-light-emitting zones similarly provides light incident to the light guide plate 4 and the phenomenon that the light that enters the light guide plate 4 shows prominent difference of illumination on the light incidence surface 42 and thus causing inhomogeneous illumination in the light guide plate 4 at location close to the light incidence surface. Thus, light emitting from the backlight source 6 is subject to light mixing by the photo coupler 8 and then enters the light guide plate 4 so as to improve homogeneity of light illumination and eliminating the phenomenon of inhomogeneous illumination in the light guide plate at location close to the light incidence surface that occurs in the known techniques, and thus being helpful for bezel slimming.

Figure 3:
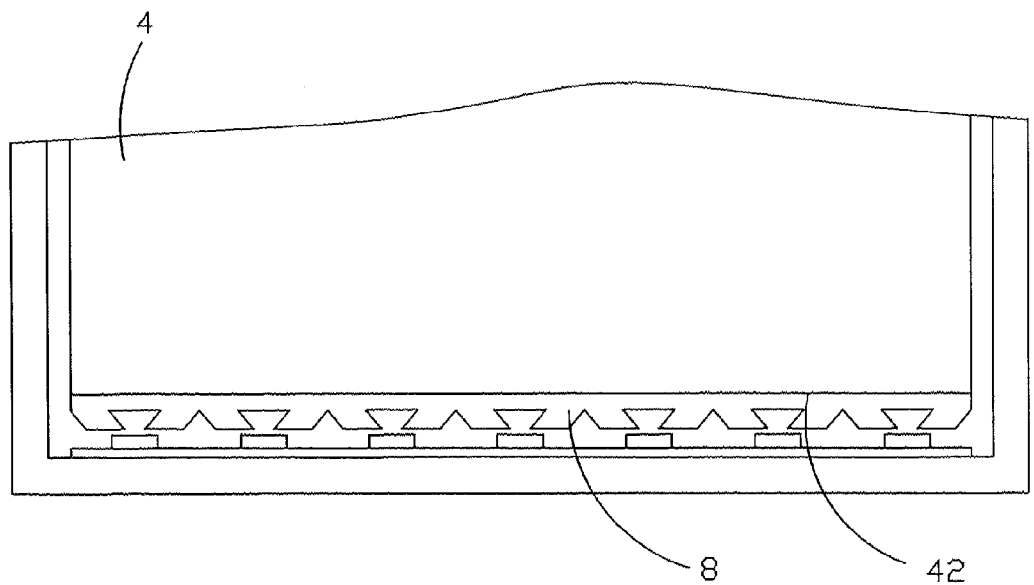
FIG. 3 is a perspective view showing another embodiment of side-edge backlight module according to the present invention.

Referring to FIG. 3, which is a perspective view showing another embodiment of side-edge backlight module according to the present invention, in the instant embodiment, the photo coupler 8 is set in contact with the light incidence surface 42 of the light guide plate 4 and can be attached to the light incidence surface 42 by adhesives.

Figure 4:
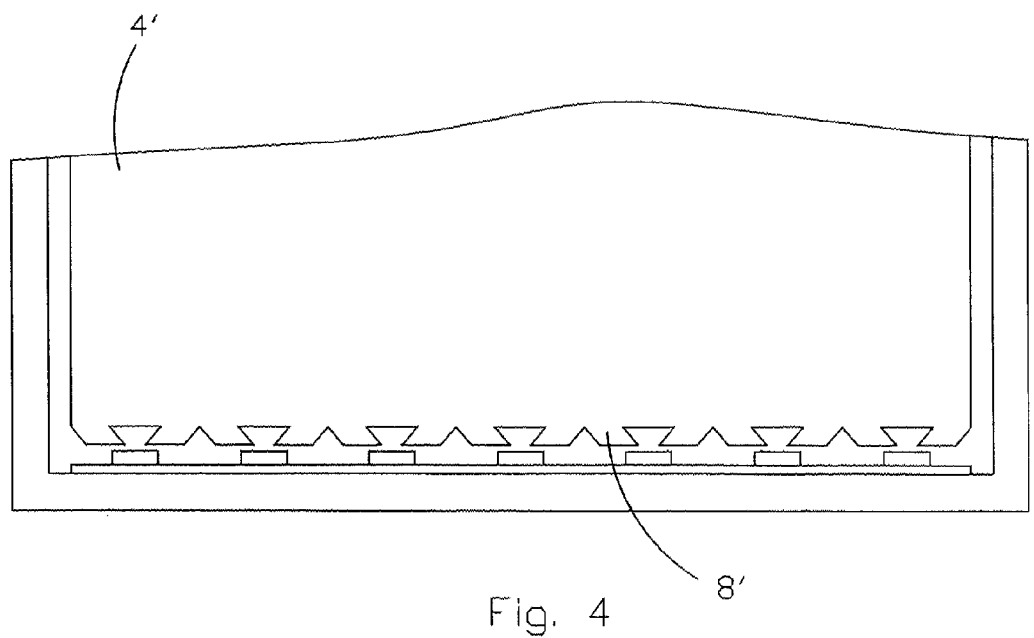
FIG. 4 is a perspective view showing a further embodiment of side-edge backlight module according to the present invention.

Referring to FIG. 4, which is a perspective view showing a further embodiment of side-edge backlight module according to the present invention, in the instant embodiment, the photo coupler 8' is integrally formed with the light guide plate 4'.

In summary, the present invention provides a side-edge backlight module, which comprises a photo coupler arranged between a light incidence surface of a light guide plate and LED lights of a backlight source in order to make lights emitting from the backlight source incident to the light guide plate in a uniform manner thereby providing the light guide plate with homogeneous light illumination and thus effectively eliminating the problem of inhomogeneous illumination of the conventional light guide plate at a location close to the backlight source, facilitating bezel slimming, and enhancing quality of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A side-edge backlight module, comprising a backplane, a light guide plate arranged inside the backplane, a backlight source arranged inside the backplane, and a photo coupler arranged between the light guide plate and the backlight source, whereby light emitting from the backlight source is subjected to light mixing by the photo coupler and then enters the light guide plate so as to improve homogeneity of light illumination of the light guide plate at a location close to a backlight source;

wherein the backlight source comprises a printed circuit board and a plurality of light emitting diode (LED) lights that is mounted to the printed circuit board and electrically connected to the printed circuit board, gaps being present between the LED lights;

wherein the photo coupler comprises a main body and a plurality of first slots and a plurality of second slots that face the backlight source, the first slots being arranged to correspond to the LED lights, the second slots being arranged to correspond to the gaps between the LED lights; and wherein the first slots are of a shape of inverted trapezoid, which diverges in an inward direction from an edge of the main body of the photo coupler that faces the LED lights, and the second slots are of a shape of triangle, which converges in an inward direction from the edge of the main body of the photo coupler that faces the LED lights.

2. The side-edge backlight module as claimed in claim 1, wherein the first slots are inverted isosceles trapezoids having a trapezoid bottom corner angle of 35-55° and a trapezoid height of 2-5 mm and the second slots are isosceles triangles having a triangle bottom corner angle that is less than or equal to the trapezoid bottom corner angle of the first slots and a triangle height that is greater than or equal to the trapezoid height of the first slots.

3. The side-edge backlight module as claimed in claim 1, wherein the photo coupler is made of glass, PMMA (Polymethylmethacrylate), PC (Polycarbonate), or MS (Methyl Methacrylate-Styrene Copolymer).

4. The side-edge backlight module as claimed in claim 1, wherein the photo coupler is spaced from the LED lights by a distance of 0.2 mm-1 mm.

5. The side-edge backlight module as claimed in claim 1, wherein the photo coupler is spaced from the light guide plate.

6. The side-edge backlight module as claimed in claim 1, wherein the photo coupler is set in contact with the light guide plate.

7. The side-edge backlight module as claimed in claim 1, wherein the photo coupler is integrally formed with the light guide plate.

8. A side-edge backlight module, comprising a backplane, a light guide plate arranged inside the backplane, a backlight source arranged inside the backplane, and a photo coupler arranged between the light guide plate and the backlight source, whereby light emitting from the backlight source is subjected to light mixing by the photo coupler and then enters the light guide plate so as to improve homogeneity of light illumination of the light guide plate at a location close to a backlight source;

wherein the main body comprises a reflection surface opposing the light guide plate and the light guide plate is directly positioned on the reflection surface of the main body;

wherein the backlight source comprises a printed circuit board and a plurality of light emitting diode (LED) lights that is mounted to the printed circuit board and electrically connected to the printed circuit board, gaps being present between the LED lights;

wherein the photo coupler comprises a main body and a plurality of first slots and a plurality of second slots that face the backlight source, the first slots being arranged to correspond to the LED lights, the second slots being arranged to correspond to the gaps between the LED lights;

wherein the first slots are of a shape of inverted trapezoid, which diverges in an inward direction from an edge of the main body of the photo coupler that faces the LED lights, and the second slots are of a shape of triangle, which converges in an inward direction from the edge of the main body of the photo coupler that faces the LED lights;

wherein the first slots are inverted isosceles trapezoids having a trapezoid bottom corner angle of 35-55° and a trapezoid height of 2-5 mm and the second slots are isosceles triangles having a triangle bottom corner angle that is less than or equal to the trapezoid bottom corner angle of the first slots and a triangle height that is greater than or equal to the trapezoid height of the first slots;

wherein the photo coupler is made of glass, PMMA (Polymethylmethacrylate), PC (Polycarbonate), or MS (Methyl Methacrylate-Styrene Copolymer); and wherein the photo coupler is spaced from the LED lights by a distance of 0.2 mm-1 mm.

9. A side-edge backlight module, comprising a backplane, a light guide plate arranged inside the backplane, a backlight source arranged inside the backplane, and a photo coupler arranged between the light guide plate and the backlight source, whereby light emitting from the backlight source is subjected to light mixing by the photo coupler and then enters the light guide plate so as to improve homogeneity of light illumination of the light guide plate at a location close to a backlight source, wherein the photo coupler is spaced from the light guide plate.

* * * * *